No. 766,051. PATENTED JULY 26, 1904.
S. T. MARLETTE.
HAME FASTENER.
APPLICATION FILED NOV. 27, 1903.
NO MODEL.
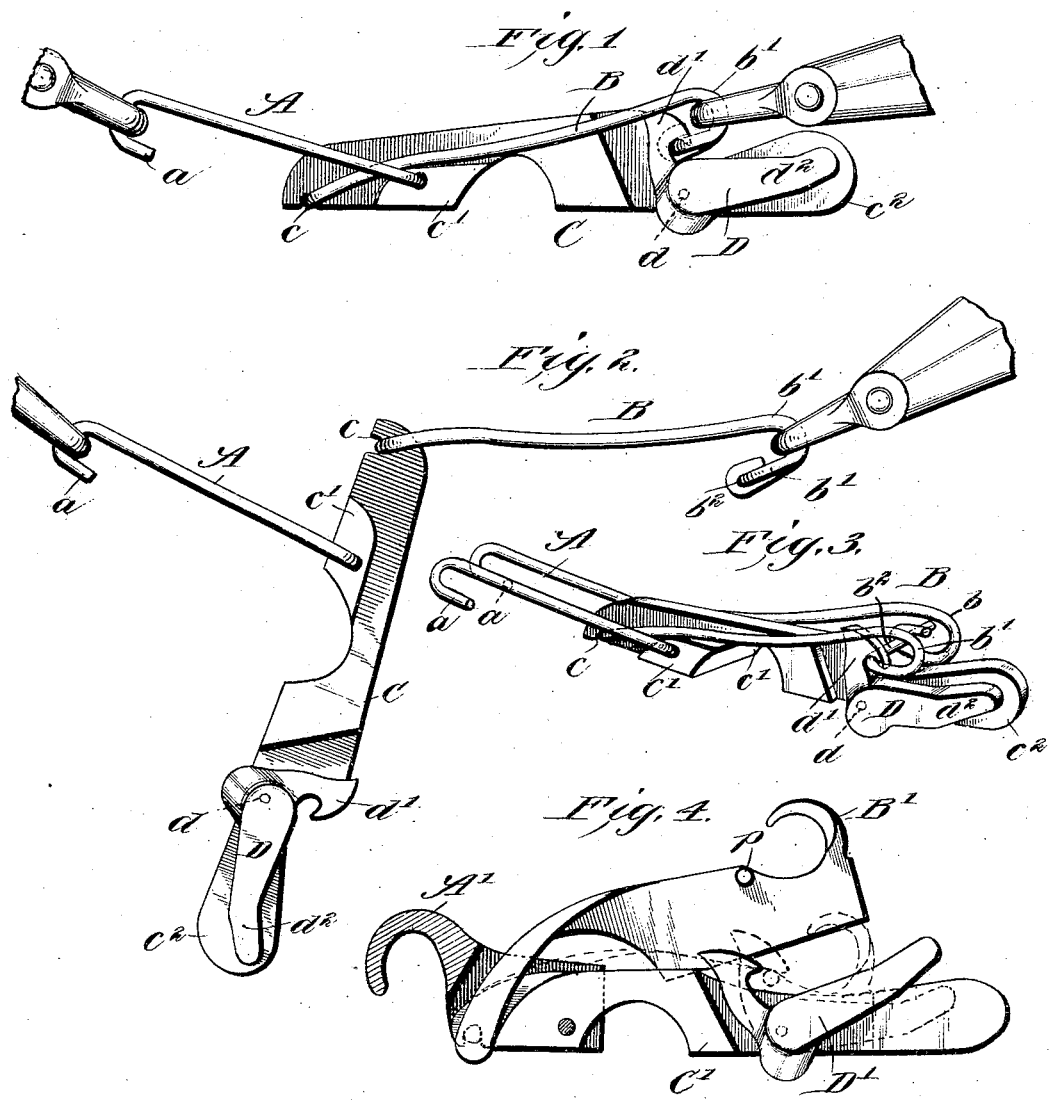
WITNESSES:
Fred S. Bradford
Edw. W. Byrn.
INVENTOR
Silas T. Marlette.
BY Munn & Co.
ATTORNEYS No. 766,051.

Patented July 26, 1904.

UNITED STATES PATENT OFFICE.

SILAS T. MARLETTE, OF BUFFALO, NEW YORK, ASSIGNOR TO ELLEN MARLETTE AND EBEN B. SMITH, OF BUFFALO, NEW YORK.

HAME-FASTENER.

SPECIFICATION forming part of Letters Patent No. 766,051, dated July 26, 1904.

Application filed November 27, 1903. Serial No. 182,843. (No model.)

*To all whom it may concern:*

Be it known that I, SILAS T. MARLETTE, a citizen of the United States, residing at Buffalo, in the county of Erie and State of New York, have invented a new and useful Improvement in Hame-Fasteners, of which the following is a specification.

My invention belongs to that class of hame-fasteners in which there are two hook members adapted to be connected to the loops at the lower ends of the hames and a lever connected to these two hook members, so that when the lever is turned it will draw the two hook members and the ends of the hames together, the lever being provided with a latch to hold the hook members in the locked position.

My improvements consist in the novel construction and arrangement of parts operating upon the above-described principle, which I will now proceed to describe with reference to the drawings, in which—

Figure 1 is a side view of my hame-fastener locked. Fig. 2 is a similar view unlocked. Fig. 3 is a perspective view of the fastener locked, and Fig. 4 is a sectional side view of a modification.

Referring to Figs. 1, 2, 3, the two hook members A and B are each made of a single piece of wire bent in the middle to form a hinge-loop and provided with bent and hook-shaped ends for its legs. The hook member A has its two terminal hooks $a$ $a$ engaged with the loop-iron at the bottom end of one of the hames. The other hook member, B, has its hooks $b$ $b'$ engaged with the loop-iron of the other hame. The ends of the hook member B are, however, formed in a peculiar manner, as follows: The end $b$ is simply curled around to form a hook; but the end $b'$ is curled around to form a hook and is then extended transversely at $b^2$ and is caught within the curl of the other hook $b$. This is for the purpose of forming a part of the locking device hereinafter described.

C is the operating-lever. This consists of a metal bar having near one end laterally-projecting lugs $c'$ $c'$ and a curved notch $c$ and at the other end a handle portion $c^2$, bearing a locking-latch D.

Through the lugs $c'$ $c'$ and the body portion of the lever is formed a hole in which is seated the middle loop portion of the hook member A, forming a hinge-joint therewith. The other hook member, B, is made not so wide as A, and the middle loop portion of the member B is seated in the notch $c$ of the lever, and the two legs of the hook member pass over the lugs $c'$ $c'$, which latter act as stops for the legs of said hook member.

The latch D is pivoted at $d$ to the handle portion of the lever, and said latch consists of an upwardly-projecting bevel-faced hook $d'$, facing outwardly, and a right-angular projecting and weighted arm $d^2$, which projects outwardly and extends nearly, if not quite, to the end of the handle portion of the lever. The bevel-faced hook $d'$ when the hame-fastener is in the locked position, as in Fig. 1, extends over and locks against the cross-bar $b^2$, thereby keeping the handle end of the lever from dropping down, and the weight of the horizontal weighted arm $d^2$ of the latch holds the hook portion $d'$ always engaged.

For applying the fastener the hook members are inserted in the loops of the hames, with the lever in the position shown in Fig. 2. Then when the lever is swung to the right and upwardly the loop ends of the hook members are drawn past each other, drawing together and tightening the lower ends of the hames, and when the handle of the lever reaches its highest position the latch drops over the cross-bar $b^2$ and locks the fastener rigidly in its closed position.

To unlock the fastener, the horizontal arm of the latch and the handle end of the lever are grasped between the thumb and forefinger. This action throws back the hook of the latch, and without releasing the hold a downward swing of the lever opens the fastener in a simple and practical way.

By making the hook members in the shape of wire loops certain advantages are obtained, as follows: In the first place the two legs of each hook may be sprung together when inserting the hooks in the hame-loops, so that they may expand again when in the hame-loops, and thus hold with a spring action against accidentally falling out. Furthermore, when the legs of the hook member B come to a bearing against the lugs $c'$ $c'$ of the lever the cross-bar $b^2$ presses upwardly with a spring action against the locking-latch to hold it firmly engaged against jolting out.

In carrying out some of the features of my invention I may, as shown in Fig. 4, construct the hook members of solid bars in the form of malleable castings instead of making them of wire, as in Figs. 1, 2, 3. In this case the hook members A' and B' and the lever C' are pivotally connected for exercising the same leverage in drawing the hames together as in Figs. 1, 2, 3, and the hook-latch D' on the handle portion of the lever occupies the same position and relation, but is made to engage a laterally-projecting-pin $p$ on the hook member B'.

Having thus described my invention, I claim as new and desire to secure by Letters Patent—

1. A hame-fastener, comprising two hook members, and a lever connecting and adapted to draw the same together, both hook members being pivotally connected to the lever, and one of them having at its end a locking projection for a latch-hook, and the lever having at its extreme outer end a handle portion bearing a locking-latch pivoted at its lower end to the handle and having its hook portion extended upwardly and facing outwardly and having also a rigidly-attached horizontal arm extended outwardly to act by its gravity upon the hook and to lie alongside the handle of the lever for simultaneously opening the latch and deflecting the lever substantially as described.

2. A hame-fastener, comprising two hook members, a lever connecting and adapted to draw the same together and a latch for locking the same closed, both of said hook members being made of wire bent in the middle to form articulation-centers and one of said members having separate terminal hooks, and the other having one branch curled and the other branch curled and then extended transversely to form a locking-hold for the locking-latch substantially as described.

3. A hame-fastener, comprising two hook members, each made with two branches with the branches of one set wider apart than the branches of the other, a lever arranged between them and pivotally connected to both and having laterally-projecting perforated lugs receiving one of the hook members, the other and narrower hook member being made elastic and lying upon the lugs of the lever, and a locking-latch connecting the lever to the narrower hook member substantially as described.

SILAS T. MARLETTE.

Witnesses:
 JACOB J. GIESZ,
 CHARLES F. HOUCK.